United States Patent [19]
Becker

[11] 4,082,452
[45] Apr. 4, 1978

[54] PHOTOPRINTING ATTACHMENT SYSTEM FOR ENLARGERS

[76] Inventor: Eugene Becker, 7348 183rd St., Flushing, N.Y. 11366

[21] Appl. No.: 621,473

[22] Filed: Oct. 10, 1975

[51] Int. Cl.² .................. G03B 27/58; G03B 27/32
[52] U.S. Cl. ........................................ 355/74; 355/77
[58] Field of Search ............... 355/133, 74, 72, 39, 355/63, 123, 127, 75, 77, 18, 52, 55; 354/12, 14

[56] References Cited

U.S. PATENT DOCUMENTS

| | | | |
|---|---|---|---|
| 2,088,710 | 8/1937 | Lewis | 355/77 X |
| 2,155,094 | 4/1939 | Kiessling | 355/52 X |
| 2,490,794 | 12/1949 | Florsheim | 355/52 |
| 2,510,363 | 6/1950 | Anderson | 355/75 |
| 2,537,069 | 1/1951 | Lohr | 354/14 |
| 2,848,923 | 8/1958 | Diefenbach | 355/74 |
| 2,915,941 | 12/1959 | Finberg | 355/72 X |
| 2,976,785 | 3/1961 | Bouffilh et al. | 355/52 X |
| 3,409,359 | 11/1968 | Mullan | 355/77 X |
| 3,625,595 | 12/1971 | Fleischman | 355/55 X |
| 3,626,460 | 12/1971 | Miller | 354/14 |
| 3,632,197 | 1/1972 | Shelton | 355/18 |
| 3,642,370 | 2/1972 | Meredith, et al. | 355/75 |
| 3,677,636 | 7/1972 | Stein | 355/18 |

*Primary Examiner*—Donald Griffin

[57] ABSTRACT

A photolettering, or photoprinting, attachment system for use with standard photographic enlargers, which includes an easel for holding photographic printing paper, comprising removable shield means to cover the paper and means to hold a layout positioning sheet in register with the photographic printing paper; said system may also include a film strip font carrier for positioning at the film plane of the enlarger.

20 Claims, 12 Drawing Figures

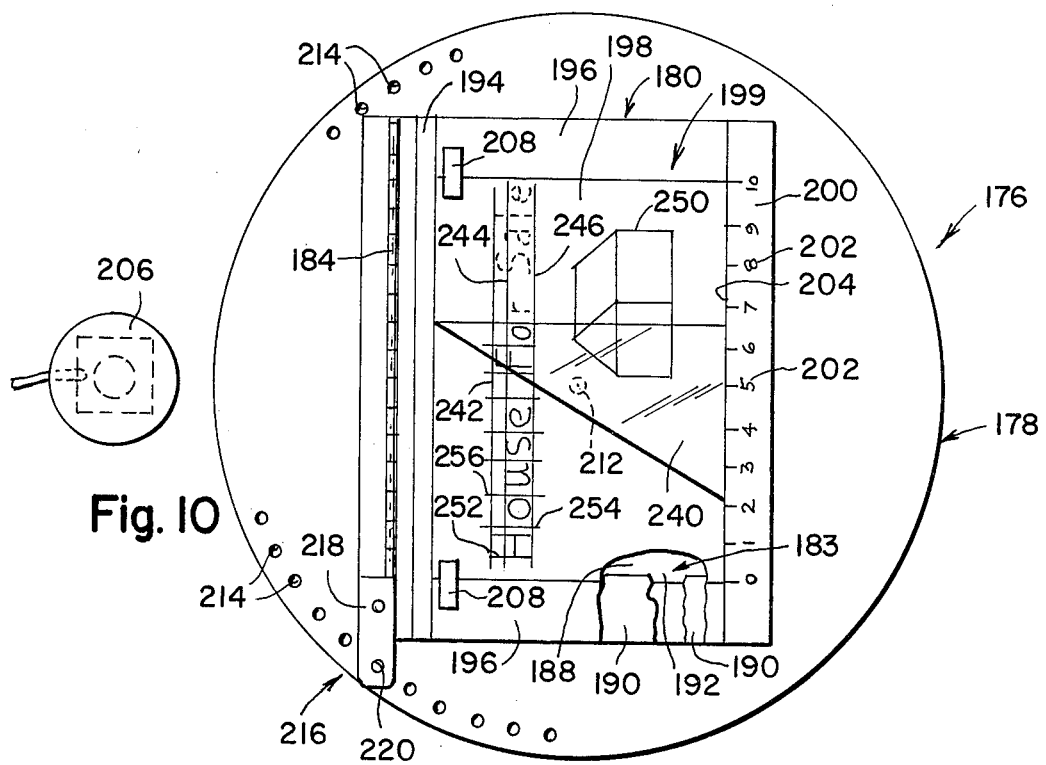
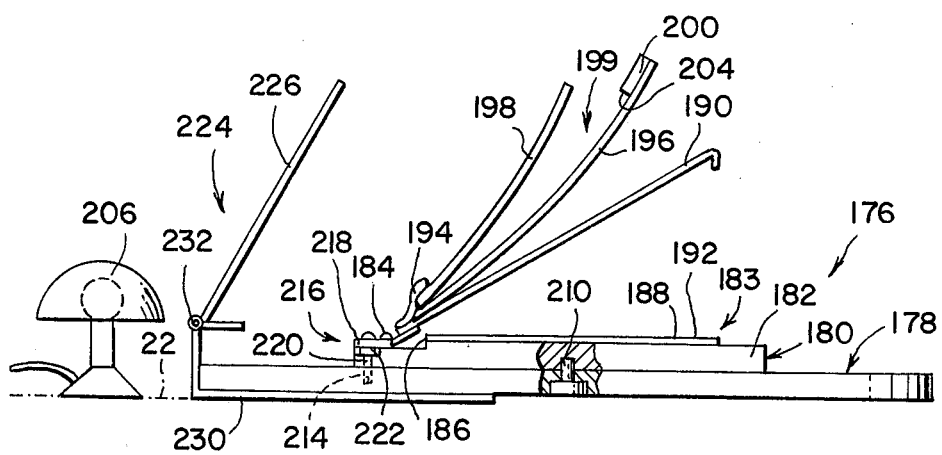
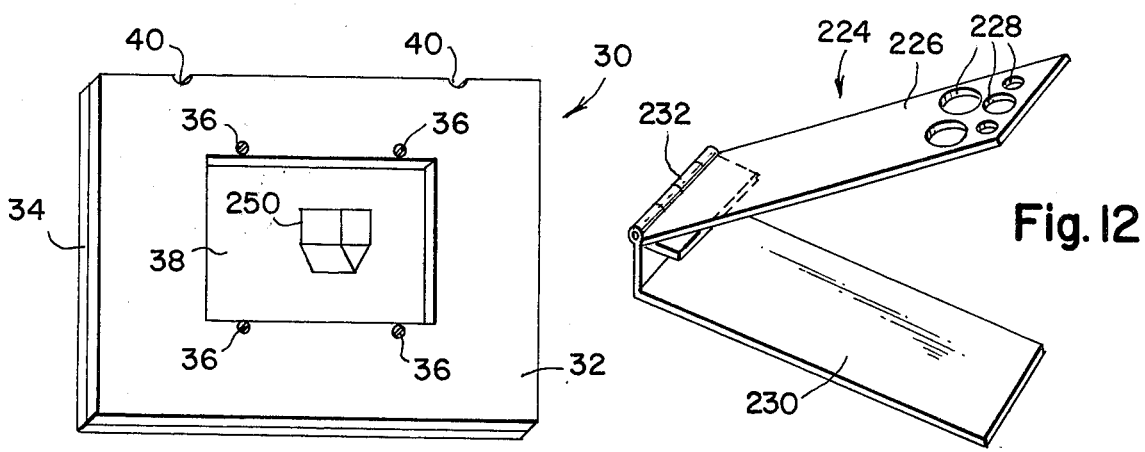

PHOTOPRINTING ATTACHMENT SYSTEM FOR ENLARGERS

BACKGROUND OF THE INVENTION

Preparing of a master having type of selected type font or style and other illustrative material by means of photography is known to the arts. However, this is usually done by special equipment designed specifically for the purpose. It is an object of this invention to provide an easel with means to hold photographic print paper and a layout sheet in registration and a simple film font carrier for various type style or fonts adapted for use with standard types of photographic enlargers which will be easy to operate and economical to set up and which will not require the specialized systems of the prior art.

It is a further object of the invention to provide auxiliary lenses for attachment of the font carrier to create special effects.

Further objects and advantages will become apparent from the specification hereinbelow.

BRIEF DESCRIPTION OF THE INVENTION

The invention is made in the form of an easel for use at the printing station and a plate which is adapted to fit at the film plane (or transparency station) of most standard types of photographic enlargers. The easel is designed to be placed at the usual base (or printing station) of a photographic enlarger and comprises a holding station for light sensitive means such as photographic printing paper and a holding station for layout sheets and means overlying and in register with the holding station for the photographic printing paper so that the operator may plan and space and record the exposures necessary to the printing without affecting the final print.

The film font carrier comprises a plate which has a film guide for reeling a strip of film such as one having a type font as well as other selected strips of film. The reeling system includes a storage reel and a pickup reel. The font carrier plate and film guide is adapted to fit within a standard enlarger in the space usually provided for the negative film holder, or carrier, designed to hold a film selected to be enlarged by the enlarger. When the device of the invention is in place in the film plane (or transparency station) of a photographic enlarger, various types of lettering fonts can be reeled on film strips along the film guide and successive exposures made to provide for words, sentences or paragraphs in various selected types of capital and lower case letters. The letters may also be optically treated to render them in italic form and in other shapes by means of auxiliary lenses provided for use with the film strip font carrier.

BRIEF DESCRIPTION OF THE DRAWINGS

The system of the invention is illustrated in the accompanying drawings in which:

FIG. 9 is a perspective view of a negative carrier for enlargers known to the art;

FIG. 10 is a top plan view of the printing station easel;

FIG. 11 is a side elevantion of the printing station easel, and

FIG. 12 is a perspective view of a radius layout sheet locator.

DETAILED DESCRIPTION OF THE INVENTION

Figure 1:
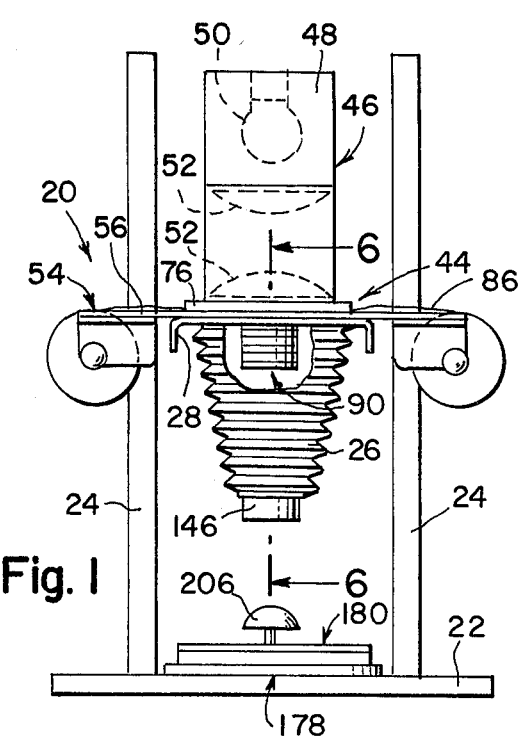
FIG. 1 is a front elevation with parts cut away and parts in phantom.
Figure 2:
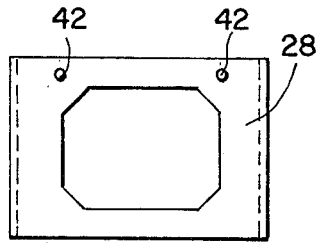
FIG. 2 is a top plan view of an enlarger plate known to the art.
Figure 3:
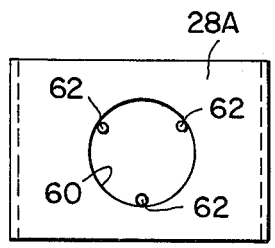
FIG. 3 is a top plan view of another enlarger plate known to the art.
Figure 4:
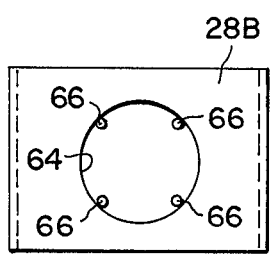
FIG. 4 is a top plan view of another enlarger plate known to the art.
Figure 8:
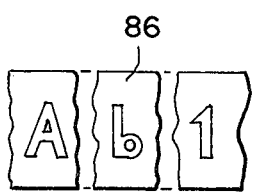
FIG. 8 shows a portion of a film strip used with the invention.
Figure 5:
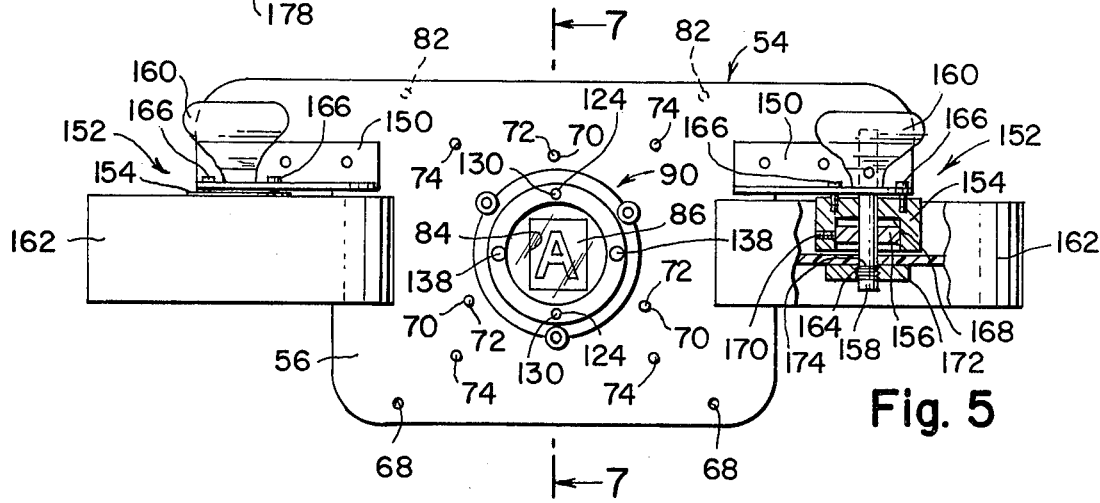
FIG. 5 is a bottom plan view of the film strip font carrier of the invention with parts cut away and parts in phantom.
Figure 6:
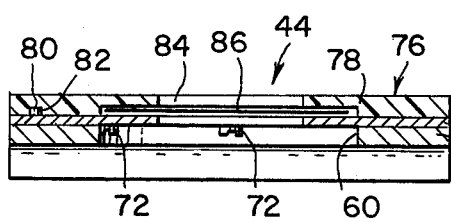
FIG. 6 is a sectional view along the lines 6—6 of FIG. 1 showing the film strip font carrier of the invention mounted on an enlarger plate.
Figure 7:
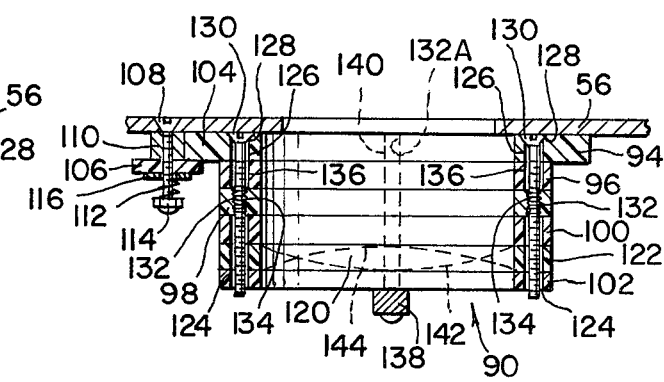
FIG. 7 is a sectional view along the lines 7—7 of FIG. 5 showing a portion of the film strip font carrier plate and the lens mount attached to it.

The invention is used with a standard photographic enlarger such as that indicated at reference numeral 20. The photographic enlarger 20 has, or is associated with, a printing station such as a base, or bed, 22 for holding photographic printing paper, and a frame or stand means 24. The enlarger 20 has a bellows 26 over which there is an enlarger plate 28 on which a negative film carrier, or film holder, 30 may be placed for holding a negative film to be enlarged.

The negative film carrier 30 is a standard one well known to the art and comprises an upper frame 32, a lower frame 34, and pins 36 to hold the frames of the carrier 30 together with a film or negative 38 in place between the pins 36. There may also be guides, such as notches 40, to position the carrier 30 over an enlarger plate at the film plane of an enlarger (such as against pins 42 of an enlarger plate such as plate 28).

The enlarger 20 comprises an upper portion 46 which includes the lamp housing 48, the lamp 50 and the condensers indicated at 52. The lamp housing 48 is shown in exploded view. However, it is usually hinged to the bellows portion 26 at the film plane (which shall be referred to as the transparency station 44 just above plate 28).

The Film Strip Font Carrier Attachment

The film strip font carrier means 54 of the invention is illustrated in the drawings as an attachment having a plate-like main frame 56 which is adapted to fit over the enlarger plate 28 of the enlarger 20 to selectively replace the negative carrier 30.

The negative carrier 30 may be attached or fitted over the plate 28 in different ways. For example, in the OMega D2 enlarger the negative carrier 30 fits over an enlarger plate 28 as described. The lamp housing 48 is brought down over the carrier 30 to hold it firmly over the enlarger plate 28. This type of construction for holding a negative carrier in the transparency station 44 is found in many standard enlargers, however the enlarger plate may differ somewhat.

Enlarger plate 28A is a component of another type of enlarger known as Omega B8. In an Omega B8 the negative carrier (not shown) is fitted over plate 28A by having downwardly depending projections which fit into the circular opening 60 of the plate 28A. The downward projections are indicated at reference numerals 62.

In a third type of enlarger, the Beseler 4 × 5 enlarger, there is a larger aperture or opening 64 in the plate 28B which usually requires four downwardly depending projections 66 from a negative carrier (not shown) adapted to be fitted over it. The three enlarger plates shown, 28, 28A and 28B, are fairly representative of most types of enlarger plates on standard enlargers.

In order to adapt the frame plate 56 of the font carrier 54 to fit these standard types of enlargers, the following provisions have been made: First, a pair of holes 68 are provided to selectively mate with the pins 42 of the enlarger plate 28. Secondly, a series of three threaded holes 70 are provided into which Fillister head screws 72 are installed so that the screw heads will depend downwardly and fit within the opening 60 of plate 28A in the relative positioning as shown at reference numerals 62. A third set of four depending screws is provided as shown at reference numerals 74 at the bottom of plate 56. These four screw heads 74 should fit within the opening 64 of the Beseler enlarger plate 28B in the same manner as screw heads 72 fit within opening 60 of plate 28A. Thus the plate 56 of the font carrier 54 is adapted to fit various types of enlarger plates.

It is preferred to use Fillister head screws for parts 72 and 74. However, any type of pin or projection which can be depended from the bottom of plate 56 and which will mate with openings 60 and 64 can be used.

Film strip font carrier 54 is also provided with a film guide 76 within clearance plate 78 which has holes 80 positioned to fit over pins 82 on the top of frame plate 56. Clearance plate 78 also has a film gate 84. When clearance plate 78 is placed over plate 56 which is then fitted into position over plate 28 at transparency station 44, the lamp housing 48 is swung back over the font carrier 54 so that it may be held firmly in place.

The clearance plate 78 may be made of a transparent plastic which may be tinted to reduce exposure to light, if desired. The film strip 86 will travel along the pathway of the film guide 76 so that a desired portion can be positioned at the film gate 84. The film gate 84 is positioned at the film plane of the enlarger when the plate 56 is in position, as shown in FIG. 1 of the drawings. The film plane of the enlarger shall be referred to as the transparency station 44.

The Lens Mount

A lens mount 90 is provided for lenses which may be used with the invention. The lens mount 90 is located at the underside of the plate 56 below the film gate 84. The basic lens mount 90 is made up of five rings 94, 96, 98, 100 and 102, preferably made of a plastic material. The inside diameter of the rings are approximately $2\frac{7}{8}$ inches or any inside diameter which is adapted to fit the lenses used. The outside diameter of the top ring 94 is approximately one-half inch greater than the outside diameter of the other rings in order to provide a one-fourth inch shoulder 104 to permit retaining means, such as fiber retainers 106, to hold the lens mount ring 94 to the bottom of the plate 56 in the following manner: Flat head screws 108 are put through the plate 56 and a threaded spacer 110 is threaded onto the screws to hold them in place. The threaded spacer 110 is approximately one-fourth inch long, that being the thickness of the rings, particularly the top ring 94. Fiber retainers 106, approximately one-half inch in outside diameter, or sufficiently long enough to extend over the shoulder 104 formed by the first ring 94, are then placed around the shafts of the screws 108.

Springs, preferably helical springs 112, are placed around the screws 108 and the mounting assembly is completed by acorn nuts 114 on the end of each screw to hold the springs 112 in tension against the fiber retainers 106. It is also preferred to have a washer 116 between the spring 112 and the fiber retainer 106.

The lens mount 90 of the device is used to support special effects lenses (indicated at 120) to italicize, back slant, compress and extend the lettering or other visual material on the film. These functions are accomplished because the lens 120 provides an angle of slant to the image on the film.

In the preferred form of the invention the special lens or lenses 120 (usually plano convex and plano concave may be used interchangeably as desired). The farther the lens 120 is from the film the greater the angle of slant. They are usually placed slightly more than one inch from the film plane (transparency station) and this is accomplished by the use of the five rings 94, 96, 98, 100 and 102 in the lens mount 90 which are approximately one-fourth inch in thickness as spacer rings. For example, the fifth ring 102 in the lens mount 90 may be used underneath a lens 120 or it may be placed between the lens 120 and the transparency station 44 at the film gate 84, thereby adjusting the distance of the lens 120 from the film plane between an inch and an inch and a quarter to decrease or increase the angle of slant, as desired. The fifth ring 102 is used either as a retaining ring for the special lens 120 or it may be used as a spacer ring, depending on its position.

The lens itself has a ring 122 adapted to coincide with the rings 94 to 102 of the lens mount 90. Approximately at 90 degree intervals around the ring 102 the ring has openings 124. The top ring 94 has four openings 126 having beveled tops 128 so that two openings 126 can be selected to hold the beveled heads of flat head screws 130. One ring, such as centrally located spacer ring 98, is provided with threaded openings 132 to fit the threaded portion 134 of screws 130. The other rings have four clearance openings 136 so that the rings can be moved easily with relation to screws 130 as well as with thumbscrews 138. Thumbscrews 138 are passed from underneath through the holes of the rings which are 90° offset from the holes in line with screws 130.

Screws 130 coming from the top are threaded into openings 132 and hold third ring 98 at center to ring 94 with second ring 96 between them. The mount 90 is completed by threading the shafts 140 of thumbscrews 138 up from below into openings 132A to hold ring 100, lens ring 122 and lower ring 102 in position in the mount 90.

All of the rings may be removed from the lens mounting 90 by unscrewing the screws 130 so that the lens 120 itself may be placed anywhere within the positioning of the lens mount. In other words, the lens 120 may be in the second position below the aperture in the adapter plate or under ring 94 or in the sixth position below the plate 56 or any one of the positions in between as desired. This permits the angle of slant to be varied from a low angle where the lens 120 is closest to the film gate 84 to a greater angle where the lens is farther away from the film gate 84.

The special lenses in general are denoted by reference numeral 120. There may be several such lenses, for example a plano convex lens is indicated by dotted lines 142 and a plano concave lens by dotted lines 144. It is to be understood that both lenses are mounted in the same manner as described for the lens as reference numeral 120, the only difference being in the convex and concave characters of the lenses.

The plano convex special lens 142 will serve to italicize, back slant and extend the lettering and the plano concave special lens 144 will serve to italicize, back slant and compress the lettering. By using the special lenses 142, 144 together with the main enlarger lens 146 for focusing, many varied effects can be obtained. The lens mount 90 can be rotated 360 degrees, providing a universal mount for adjusting the lens to any position desired.

Reel Support and Reeling Means For The Film Strip Font Carrier

There are a pair of brackets 150 attached to or formed on the font carrier plate 56 on which the reeling means 152 are located. The reeling means 152 comprise a pair of bearing support housings 154 which support bearings 156 and winding knobs 160 and shafts 158 to which the film reels 162 are attached, by means of threaded attachment means 164. The bearing supports 154 are attached to the brackets 150 by means of screws 166. The bearing housings 154 are provided with recesses 168 for the bearings 156. The bearings 156 which may be ball bearing assemblies pressed on the shafts 158 are also locked within the housing 154 by means of a set screw 170. The bearings 156 themselves are the usual type of ball bearings and an important feature of the bearing arrangement is that the shaft will be locked into position so that it will freely rotate and yet will not move axially and will not pull out.

The reel 162 is provided with a threaded hub 172 which fits onto the threading 164 at the end of the shaft. When the threaded hub 172 of the reel 162 is threaded to the threading 164 of the shaft, it will bottom out at the end of the threading 164 of the shaft depicted at reference numeral 174. Thus it will be understood that when a reel is threaded to the shaft of the reeling means there will be some spacing between the reel 162 and the bracket 150 so that the reel may reel freely. This is a preferred form of reeling means. Any other reeling means which will reel the film in the proper manner may be used.

The Easel

The easel 176 is made up of two separable parts in removable pivotal connection. There is a lower frame 178 and an upper frame 180. The upper frame portion 180 may be removed and used as a complete unit independently of the lower frame portion 178. The easel upper frame portion 180 has a body portion comprising a base 182 preferably made of wood. However, any suitable material may be used. Easel frame 180, without frame 178, may be positioned at the enlarger base 22 for use as a complete and separate easel unit by itself.

In the form of easel frame 180 shown, the easel base 182 has a piano type hinge 184 at the upper portion which is undercut at 186 to accommodate the width of the hinge to provide a substantially even surface between the top of the hinge and the base 182. The upper surface of the easel frame base 182 is used to support the light sensitive means such as photographic paper 188 on which the lettering or other work is done, as a light sensitive means holding station 183. The photographic paper 188 may be held in place by a hold-down frame 190 which is hinged to the base 182. The frame 190 is preferably made of sheet metal. The frame 190 which is attached to the hinge 184 comes down over the photographic paper 188 and holds it in place.

The frame 190 is of a size that will cover the photographic paper 188 around the perimeter 192 of the paper 188 for approximately one-fourth inch to hold it in place. Also annexed to the hinge 184 by means of a separate (second) hinge arrangement, in this case a flexible tape 194, is a layer 196 of opaque, preferably flexible material which serves as a shield means to cover the photographic paper 188 from light and also as a holding station 199 for a layout sheet 198. The shield means 196 is also provided with a guide element 200 which has graded spacings 202. In the preferred form of the invention the graded spacings 202 may be in inches. However, they can be in centimeters or any other calibration means desired.

The layout sheet 198 is provided for laying out or positioning the material to be projected and printed on the photographic paper 188. Sheet 198 is laid against the guide edge 204 of guide element 200 and since the light sensitive means 188 in the preferred form of the invention is a photographic printing paper 188 in a standard 8 × 10 size, the layout sheet 198 is also provided in an 8 × 10 size. The 8 × 10 size is preferred for standardization only. Any size photographic paper and any corresponding size of layout sheet can be used.

Inasmuch as photographic work is done in a dark room and since the operator needs some kind of light to guide him, an orange viewing lamp 206 is provided. The orange viewing lamp 206 is used because the usual type of safe light will not afford the operator sufficient light to use the layout sheet 198. This will be described hereinbelow.

In the preferred form of invention an orange lamp 206 of 7½ Watts is used. This will provide sufficient light for the operator; however, it may also fog the photographic paper 188. In order to prevent fogging of the photographic paper 188, the shield means of the easel 196 is provided in the form of an opaque, flexible material preferably a plastic material. The orange lamp 206 is placed behind the hinge 184 of the easel frame 180 so that when the opaque uppermost shield layer 196 is raised, it will move toward the lamp 206 (see FIG. 11) and shield the photographic paper 188 from the rays of the lamp 206. It is not desirable to attach the lamp 206 to the easel 180 itself since in operation the easel 180 is moved around. However, the lamp 206 should be placed on the enlarger base 22 behind the area in which the easel 180 is used in a position where the paper 188 will be shielded by raising the opaque shield 196. The best position for the lamp is somewhere along and behind the hinge 184 edge of the easel 180 and in a central position.

Reference is now made to FIG. 10 of the drawings which shows a top plan view of the shield 196 and a layout paper 188 positioned above or on the top of the shield 196 on the layout sheet holding station 199. This may be done by using masking tape, or adhesive tape, or any other tape for positioning means (as indicated at reference numeral 208). The layout sheet 198 is placed along the guide element edge 204 so that it will correspond to the photographic paper 188 held in place by the hold-down frame 190 underneath the opaque shield flap 196. The guide egde 204 overlies and is in relative correspondence with the lower edge of the photographic paper 188. By making the layout sheet 198 correspond relatively in position to the photographic paper 188, the position of any markings made by the operator on the layout sheet 198 will correspond relatively to the same positionings on the photographic paper 188. Such markings are used to guide the operator in making exposures. Any marks made on the layout sheet will register in position as between the layout sheet 198 and the photographic paper 188. The object, of course, is to expose the photographic paper 188 with lettering or other material as described so that it will become a mechanical, or the like, for further processing in the printing of photolith arts. The mechanical can thus be used as a camera ready copy for further photographing or it may be used as is, as a finished article such as a sign, a type of art work, or lettering work. The photograph ready copy may also be combined with other materials photographically or otherwise to make a finished product. For example, a mechanical of the invention can be made using the lettering film strips 86 of the invention to create the copy and then a negative 38 in a negative carrier 30 showing an object can be placed in the transparency station 44 and be exposed on the photographic paper 188 in the usual manner to make a mechanical in which the copy and the picture are combined or even superimposed (see the lettering and the house in FIG. 10).

The upper frame portion 180 of easel 176 may also be used in combination with the lower frame portion 178 for printing in a circular format. The two portions of the easel 176 are held together in pivotal connection by means of the pivot 210. The pivot 210 should connect the upper frame 180 to the lower frame 178 at a pivot 212 which is centrally located with relation to the sheet of photographic paper 188 when on the holding station 183. A series of holes 214 are placed at the circumference of the lower easel portion 178, which is preferably circular. The holes 214 are along a radius from the pivot point 212. While the lower easel frame is preferably circular, it can of course be any shape provided it has a circular array of holes 214 on a radius from the pivot point 212 as described hereinabove. The circular array of holes 214 will enable an operator to photographically print in a circular format, letters or other visual indicia as previously described hereinabove, or to provide various types of art work and graphic designs.

If the holes 214 are placed approximately 3 degrees apart, 120 holes 214 will be provided which will enable an operator to make 120 individual and equal spacings for printing. The operator may reduce the number of spacings and enlarge their area by skipping one or more of the holes 214. For example, if he marks off every fifth hole, he will provide for a 15° space rather than a 3 degree space. This increases the width of the spaces and decreases the number of spaces available, as desired by the operator.

Indexing means 216 are provided to hold the upper frame 180 at one of the holes or stops 214. The indexing means comprises a spring arm 218 attached to frame portion 180 and has an index pin 220 adapted to fit into each one of the stops by action of the spring 218. When the spring 218 is lifted the pin 220 may be removed from the stop 214 and when the spring is released the pin 220 may enter another stop 214 at a different position. The pin 220 is held in place by a knurled threaded nut 222 so that it may be removed when the easel portion 180 is used independently of the lower portion 178.

A radius layout sheet locator means 224 is provided to locate positions on the layout sheet 198 when the lower easel portion 178 is used. The radius layout locator means comprises a templet 226 having variously sized openings 228. The locator means 224 has means to maintain a position such as a base portion 230 which may slide under the easel portion 178 and be held in place by the weight of easel portion 178. The means to hold the radius locator means in position may be shifted as desired by the operator so that a portion 228 of the desired size may be placed at the desired space over the layout sheet 198 for locating purposes. The templet 226 is hinged to the locator means 224 by means of a hinge 232 to permit it to be raised and lowered for purposes of raising the shield 196 when it is desired to make an exposure.

A circle 228 of the desired size may be located at 12 o'clock position at the desired distance from center, such as pivot point 212. The easel portion 180 may then be rotated under the fixed position of the selected circle 228. Exposures in each successive portion can be marked and made as described hereinabove. The locator means 224 is located and held in position, as described hereinabove, by the weight of easel portion 178. Thus the locator means 224 and the easel portion 178, together with the indexing means 216, make it possible to expose lettering or designs in a circular format.

Operation of the Invention

The operator turns on the light 206 to illuminate the layout sheet 198. A film strip 86 is placed in the font carrier 54 and the desired material is then focused on the layout sheet through the enlarger lens 146. The position of the projected letter from the strip 86 can be marked by a pencil or other means on the layout sheet 198. It is preferred to use a transparent triangle 240 which may be placed against the guide edge 204. Thus the guide edge 204 and triangle 240 are provided to form another locator means to locate the positions on the layout sheet 198. While it is preferred to use a triangle 240, any type of straight edge which can be guided by the edge 204 will serve as a locator means.

It is preferred to provide guide lines, such as lines 242, 244 and 246, which will serve as positioning lines for focusing the capital letters and the lower case letters. The capital letters will be focused between lines 242 and 246 and the lower case letters between lines 244 and 246, as can be seen in FIG. 10 of the drawings. These guide lines 242, 244 and 246 may be placed on the layout sheet 198 by means of a T square (not shown) in any of the usual manners known to the art. The guide lines may be located on the sheet 198 by projecting the capital and lower case letters of the desired size and then using the T square along the limits of the letters as described above.

Let us assume that it is desired to print the legend "House For Sale" together with a representation of a house such as that indicated at reference numeral 250. The operator may first focus a letter H as at reference numeral 252 and line up the triangle 240 with its vertical straight edge just to the right of letter H and draw a line indicated by reference 254. The shield 196 is then raised to permit an exposure to be made on the photographic paper 188 and such an exposure is made. The shield 196 is lowered and the operator reels the film strip 86 until a lower case letter *o* appears in the film gate and focuses the *o* on the layout sheet 198. The easel portion 180 is moved to the left so that the focused letter *o* will be between lines 244 and 246 and to the right of the pencil line 254 on the layout sheet. The triangle 240 is then moved and a second pencil line 256 is made to locate the exposure position of the letter *o*. The shield 196 is again lifted and an exposure is made of the letter *o*. This process is repeated for the lower case letters *u*, *s* and *e* and for the rest of the legend "For Sale". When the operator is finished the layout sheet 198 should have pencil marks for the guide lines as well as the separation of the letters as aforesaid and the exposures of the letters should have been made in their proper position. He now desires to make an exposure of the house 250. This is done by removing the font carrier 54 and replacing it with a standard negative carrier 30 which contains a negative 38 having a picture of the housing 250. This is then focused on the layout sheet in the desired place, the shield 196 is lifted and an exposure is made. The mechanical which will be made out of the photographic paper 188 is now completed and developed. In order to position the letters and the pictorial material, such as house 250, the operator moves the easel upward and downward and from left to right until the material focused on the layout sheet 198 is in the proper position. He then makes his exposure as described. The process of noting, marking and projecting is continued until the mechanical is finished, as aforesaid. If desired, the picture of the house may be superimposed on the mechanical and exposed before the lettering is placed on. This would be a matter of preference for the operator. The final developed result will be a picture of a house with the legend "House For Sale" in the proper places.

While I have described my invention in its preferred forms, there are other forms which it may take without departure from the spirit and scope of the invention and I therefore desire to be protected for all forms coming within the claims below.

Wherefore, I claim:

1. In a photoprinting attachment system for printing visual material from transparency means onto light sensitive means through photographic enlarging devices having means to project a light path through a transparency station toward a light sensitive means holding station: the improvement comprising easel means for positioning within a path of projected light projected by such a photographic enlarging device; comprising main frame means comprising a light sensitive holding station means, movable shield means, a layout sheet holding station, and registration means for selectively positioning layout sheet means on the layout sheet station in registration with light sensitive means positioned on the light sensitive means holding station, said movable shield means being movable from a first position covering said light sensitive means holding station to a second position leaving said light sensitive means holding station uncovered.

2. The easel as claimed in claim 1, in which the shield means is attached to the easel main frame.

3. The easel as claimed in claim 1, in which the shield means comprises a flexible portion.

4. The easel as claimed in claim 1, in which the registration means comprises a guide edge on the shield means.

5. The easel as claimed in claim 4 which further comprises a movable frame between the shield means and the light sensitive means holding station.

6. The easel as claimed in claim 4 which further comprises layout sheet area locator means.

7. The easel as claimed in claim 6, in which the layout sheet locator means comprises grid locator means.

8. The easel as claimed in claim 7, in which the grid locator means comprises at least one edge in guided movable relation with the shield means guide edge.

9. The easel as claimed in claim 8, in which the layout sheet grid locator means comprises a geometrical shape with at least one pair of sides at right angle.

10. The easel as claimed in claim 1, in combination with at least one second light source.

11. The combination as claimed in claim 10, in which the second light source comprises an electric lamp positioned relative to the shield means of the easel so that the shield means will be interposed between the electric lamp and the light sensitive means holding station when the shield means is moved to its second position.

12. The easel as claimed in claim 1, in which the main frame means comprises a plurality of portions in pivotal arrangement comprising a lower frame portion and an upper frame portion in which the light sensitive means holding station and the shield means are attached to the upper frame portion, said upper portion being rotatably movable with respect to said lower frame portion.

13. The easel as claimed in claim 12 which further comprises indexing means relative to the positions of the said upper and lower frame portions.

14. The easel as claimed in claim 13, in which the indexing means comprises a plurality of stops arranged on one frame portion on a radius from a pivot connection between said portions and a stop engaging means is positioned on the other frame portion at an equivalent radius distance from the pivot connection.

15. The easel as claimed in claim 14, in combination with layout sheet radius locator means comprising movable template means adapted for movement to various positions over said layout sheet holding station, said radius locator means having means to maintain it in a desired position in relation to said layout sheet holding station.

16. The combination as claimed in claim 15, in which said template is movable from the first position away from said layout sheet holding station to a second position overlying said layout sheet holding station.

17. The easel as claimed in claim 13, in combination with at least one film strip font carrier for selective placement at the transparency station of a photographic enlarger comprising a main frame including film gate means and film strip reeling means.

18. The easel as claimed in claim 13, in combination with at least one negative carrier and at least one film strip font carrier for use with a photographic enlarger wherein the carriers are intended for selective placement at the transparency station of said photographic enlarger.

19. The easel as claimed in claim 1, in combination with at least one film strip font carrier for selective placement at the transparency station of a photographic enlarger comprising a main frame including film gate means and film strip reeling means.

20. The easel as claimed in claim 1, in combination with at least one negative carrier and at least one film strip font carrier for use with a photographic enlarger wherein the carriers are intended for selective placement at the transparency station of said photographic enlarger.

* * * * *